(12) United States Patent
Purohit et al.

(10) Patent No.: US 6,504,077 B1
(45) Date of Patent: Jan. 7, 2003

(54) METHOD FOR THE DECONTAMINATION OF METALLIC SURFACES

(75) Inventors: Ankur Purohit, Darien; Michael D. Kaminski, Lockport; Luis Nunez, Elmhurst, all of IL (US)

(73) Assignee: The University of Chicago, Chicago, IL (US)

( * ) Notice: Subject to any disclaimer, the term of this patent is extended or adjusted under 35 U.S.C. 154(b) by 17 days.

(21) Appl. No.: 09/685,495

(22) Filed: Oct. 10, 2000

Related U.S. Application Data

(63) Continuation-in-part of application No. 09/339,599, filed on Jun. 24, 1999, now abandoned.

(51) Int. Cl.⁷ .................................................. A62D 3/00
(52) U.S. Cl. ......................... 588/18; 423/10; 423/21.1; 423/140; 423/150.1; 423/658.5
(58) Field of Search ....................... 588/18, 242; 423/6, 423/10, 21.1, 34, 35, 55, 101, 109, 122, 131, 132, 140, 150.1, 658.5

(56) References Cited

U.S. PATENT DOCUMENTS

| | | | | |
|---|---|---|---|---|
| 4,810,405 A | * | 3/1989 | Waller et al. | 252/81 |
| 5,078,894 A | * | 1/1992 | Horwitz et al. | 252/81 |
| 5,468,456 A | * | 11/1995 | Nunez et al. | 423/10 |
| 5,587,142 A | * | 12/1996 | Horwitz et al. | 423/658.5 |

* cited by examiner

*Primary Examiner*—Steven P. Griffin
*Assistant Examiner*—Maribel Medina
(74) *Attorney, Agent, or Firm*—Emrich & Dithmar

(57) ABSTRACT

A method of decontaminating a radioactively contaminated oxide on a surface. The radioactively contaminated oxide is contacted with a diphosphonic acid solution for a time sufficient to dissolve the oxide and subsequently produce a precipitate containing most of the radioactive values. Thereafter, the diphosphonic solution is separated from the precipitate. HEDPA is the preferred diphosphonic acid and oxidizing and reducing agents are used to initiate precipitation. SFS is the preferred reducing agent.

23 Claims, 8 Drawing Sheets

SCHEMATIC DIAGRAM OF HEDPA DECONTAMINATION PROCESS FOR SURFACE CONTAMINATED SYSTEMS

SCHEMATIC DIAGRAM OF HEDPA DECONTAMINATION PROCESS
FOR SURFACE CONTAMINATED SYSTEMS

DISSOLUTION OF Fe (AS $Fe_3O_4$) IN 0.5 M HEDPA SOLUTIONS

DISSOLUTION OF NICKEL FERRITE (NiFe$_2$O$_4$) IN
0.5 M HEDPA/0.005 M SFS AT 50° C

CURVE FIT ASSUMING FIRST ORDER KINETICS IN THE DISSOLUTION OF $NiFe_2O_4$ IN 0.5 M HEDPA/0.005 M SFS AT 50°C.
THE $k=7.2 \times 10^{-5} \, s^{-1}$ FIT THE DATA WELL FOR t<300 min.

METHOD FOR THE DECONTAMINATION OF METALLIC SURFACES

RELATED APPLICATION

This is a continuation-in-part of Ser. No. 09/339,599 filed Jun. 24, 1999, now abandoned the entire disclosure of which is incorporated by reference.

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

TECHNICAL FIELD

This relates to decontamination and/or decommissioning of radioactively contaminated and/or corroded surfaces.

BACKGROUND OF THE INVENTION

In the nuclear power industry, radioactive decontamination techniques of stainless steel components, other iron-based steels and alloys, metal surfaces, and other structural materials e.g., concrete, tools, etc. have been unsatisfactory for many applications due to ineffective scale removal, target specificity i.e. damage to the metal substrate, or waste handling problems. Chemical decontamination is achieved by the use of solvents to dissolve contaminated films or scale from the steel or metal substrates. Oxide scales are formed on stainless steels, iron-based alloys, and other non-ferrous surfaces in water systems at low and high temperatures and pressures. The dissolution of oxide scales can be achieved by injecting, circulating, and draining the chemical solvents from large equipment e.g. tanks, interior surfaces of pipes, coolant pipes and steam generators, and other facility components e.g., valves, tools. Decontamination of nuclear facilities is necessary to reduce radiation fields during daily operation, to facilitate eventual equipment handling and repairs, and for decommissioning and release of components. Currently, there are many available chemical techniques that can dissolve scales or films formed on ferrous metals, each with associated limitations. In order to develop more efficient chemical decontamination solvents, it is important to understand the formation of oxide scales. For boiling water reactors (BWRs) and pressurized water reactors (PWRs) there is a good understanding of oxide scale and/or film formation.

In general, there are two types of oxide scales formed in pipe interiors from commercial water-cooled reactors. The scale material serves as a trap for contaminants flowing in the coolant system. The exact composition of the scales is dependent on the type of commercial reactor (see Table 1) and coolant system chemistry (which may vary significantly from site to site). Typically two layers form. The inner layer is formed by corrosion of the metallic or alloy substrate and an outer layer, which, in general, is not strongly adhered to the substrate, is formed typically by a combination of corrosion, precipitation, and deposition of crud from the coolant.

TABLE 1

General description of oxide scale formation in commercial PWRs and BWRs.

| Parameters | PWRs | BWRs |
|---|---|---|
| Conditions | Elevated temperatures and pressure. Reducing condition of coolant | Oxidizing condition of coolant |
| Inner layer | Magnetite, chromium (III) oxide High level of activity and difficult to remove | Magnetite, hematite, nickel ferrite $NiOFe_2O_3$, Cr depleted |
| Outer layer | Fe - rich Ni - rich | Hematite |
| Decontamination | Difficult to remove due to insolubility of Cr(III) Cr (IV) in order to dissolve | Oxide films soluble in acid |

This invention relates generally to the dissolution and treatment of minerals, oxides, scales typically found in both the BWRs and PWRs systems and other industrial facilities.

Contaminants in coolant systems are located in horizontal pipes, valves, pumps, heat exchanger, etc. The contaminants originate from activation and migration of dissolved stainless steel components (Table 2) or in some cases from defects in the fuel that permit the migration of fission products and actinides.

TABLE 2

Some major activation products found as contaminants in commercial reactors.

| Isotope | Half life (years) |
|---|---|
| $^{54}Mn$ | 0.86 |
| $^{59}Fe$ | 0.12 |
| $^{55}Fe$ | 2.68 |
| $^{59}Ni$ | $7.6 \times 10^9$ |
| $^{58}Co$ | 0.19 |
| $^{60}Co$ | 5.27 |
| $^{63}Ni$ | 100 |

Various chemicals are used to decontaminate surfaces including organic acids, complexants, and mineral acids, see for instance Horwitz et al. U.S. Pat. No. 5,078,894 issued January, 1992, U.S. Pat. No. 5,332,531 issued Jul. 26, 1994, and U.S. Pat. No. 5,587,142 issued December, 1996 and the disclosure of which are incorporated herein by reference. The Waller et al. U.S. Pat. No 4,810,405 issued March, 1989 is also incorporated by reference. Many mineral acids (e.g., HF, $HNO_3$, $H_2SO_4$) are used in decontamination solvents to dissolve oxide scales. Strong acids will dissolve the oxide scales; however they will also dissolve the metallic substrate. Typical dissolution rates of unreacted metal in mineral acids is significantly higher than the dissolution rate of oxidized metal. The dissolution of the metal substrate will deplete the acid effectiveness toward the oxide scale dissolution, increase waste volume, and compromise the structural integrity. Weak acids such as the organic acids (e.g., citric acid, oxalic acid, EDTA) are also added into decontamination solvent with the dual purpose of dissolving and complexing the dissolved metal oxide components. Some decontamination agents work primarily by dissolving the unreacted metal surface and uplifting the underlying grains and are not effective dissolution agents. This type of decontamination is not preferred in many decontamination scenarios since solids can accumulate in any dead leg or in elbows and lead to radioactive hotspots.

Various reviews have evaluated the need for decontamination and decommissioning (D&D) within DOE and surveyed D&D processes suitable for DOE applications. In general, decontamination of equipment prior to decommissioning does not require the protection of the base metal and thus may utilize the more aggressive decontamination agents; however, the acid treatment creates large volumes of waste that requires disposal. The chemical HEDPA is unique in that it can provide both protection to the base metal (important for continued operation of equipment) and large decontamination factors required for decommissioning.

SUMMARY OF THE INVENTION

The decontamination processes evaluated in this report is based on HEDPA (1-hydroxyethane-1,1-diphosphonic acid)

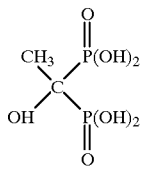

and its equivalences for this purposes, as hereinafter set forth. An extensive review of HEDPA and compounds of the diphosphonic moeity, inorganic acids, and carboxylic acids was completed by Chiarizia and Horwitz and pubished as "New Formulations for Iron oxides Dissolutions, "*Hydrometallurgy*, 27, 339–360, 1991", the disclosure of which is hereby incorporated by reference. They studied the dissolution of FeOOH (or equivalently, $Fe_2O_3H_2O$) and found that HEDPA combined with a reducing agent such as sodium formaldehydesulfoxylate (SFS) performed best with the fastest dissolution kinetics.

The advantage of HEDPA is that it is highly effective in dissolving ferrous oxides and retaining the dissolved components in solution. The diphosphonic acids, in general, display very strong chelating ability (high stability) for the trivalent transition metals and higher valency rare earths. Minerals such as magnetite, hematite, ferrite, and other iron-rich spinel phases, can be dissolved while the base-metal substrate is apparently unaffected. Furthermore, due to the thermal instability of diphosphonic acid (DPA), its decomposition produces innocuous species—a metal phosphate phase, $CO_2$, and $H_2O$. Similarly, SFS decomposes to $SO_2$ and $H_2O$.

Horwitz et al. did not address the problem of disposing of the material resulting from the treatment with a combination of HEDPA and SFS, but disposal is a significant environmental issue. We have found a method for completing the processing so the process products, other than the phosphate precipitate can be disposed of like other commercial wastes without endangering the environment.

BRIEF DESCRIPTION OF THE DRAWINGS

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DETAILED DESCRIPTION OF THE INVENTION

Figure 1:
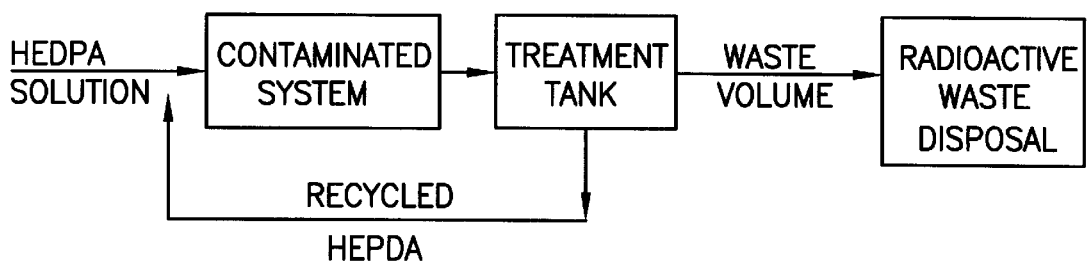
FIG. 1 is a schematic diagram of a HEDPA decontamination process for surface contaminated systems.

Since the majority of oxide scales and films are either oxide on iron-based spinel phase minerals ($A^{2+}B_2^{3+}O_4$, where A=Fe, Zn, Co, Cu, or Mg and B=$Fe^{3+}$, Al, Cr, or V), it is very important to understand the mechanism of dissolution of iron oxides. Dissolution by strong acid follows the mechanisms indicated below for magnetite, hematite, and hydrated ferric oxide, respectively:

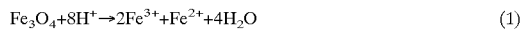

$$Fe_3O_4 + 8H^+ \rightarrow 2Fe^{3+} + Fe^{2+} + 4H_2O \quad (1)$$

$$Fe_2O_3 + 6H^+ \rightarrow 2Fe^{3+} + 3H_2O \quad (2)$$

$$FeO(OH) + 3H^+ \rightarrow Fe^{3+} + 2H_2O \quad (3)$$

In the case of metal oxides that have two oxidation states, redox reactions can affect the dissolution rate. Various studies have obtained the following expression for the rate of oxide dissolution:

$$\frac{d\alpha}{dt} = K^b(a_{H^+})^{0.5}(a_{Fe2+}\phi)^{0.5}(a_{Fe3+})^{-0.5} \quad (4)$$

where a=the fraction of oxide dissolved a=activity of the species $k^b$=kinetic rate and the redox potential is determined by the reaction

$$Fe^{3+} + e^- Fe^{2+} \quad (5)$$

According to the rate equation (1), two factors affect the rate of dissolution (a) the $H^+$ concentration and (b) the $Fe^{2+}$/Fe3+ ratio. The dissolution rate can be increased by increasing the acid concentration while any reducing action increasing the $Fe^{2+}/Fe^{3+}$ ratio will accelerate the iron oxide dissolution. Complexing agents can be used to reduce the activity of free $Fe^{3+}$. It has been found that the dissolution of metal oxides increases with the stability constant of Fe(III) complex with the anion of the electrolyte. The combined action of the reducing agent and the chelator has been described by the mechanisms below, where (Y) designates the chelator activity of non-specified stoichiometry and charge:

$$Fe_3O_4 + 8H^+ + (Y) + 2e^- 3[Fe^{2+}(Y)] + 4H_2O \quad (6)$$

$$Fe_2O_3 + 6H^+ + (Y) \rightarrow 2[Fe^{2+}(Y)] + 3H_2O \quad (7)$$

$$NiOFe_2O_3 + 8H^+ + (Y) + 2e^- \rightarrow 2[Fe^{2+}(Y)] + Ni(Y) + 4H_2O \quad (8)$$

Depending on the chemical nature of the complexant, the reaction can shift into the cathodic region that favors the iron oxide dissolution or into the anodic region that decreases dissolution. In general, a compound that would increase dissolution of iron oxide would have the following chemical features (1) increase reduction of $Fe^{3+}$, (2) strong acidity, and (3) a strong (Fe3+) chelator. Very few compounds have all three characteristics. The commercially available HEDPA is a strong acid $pk_{a1}=1.56$, $pka_{a2}=2.20$, $(pk_{a1}+pk_{a2}=3.76)$ and also a good complexant for $Fe^{3+}$ over $Fe^{2+}[b(Fe^{3+})=16.2$, $(b(Fe^{2+})=3.0]$. Furthermore, it is believed that HEDPA has reducing power for $Fe^{3+}$ in the dissolution of magnetite. It is also known that adding a reducing agent such as SFS will affect the dissolution rate of various forms of iron oxide. Although the exact binding mechanism has not been determined, the two phosphonic groups, each having a doubly bound oxygen and two hydroxyl groups, are bound to a single carbon atom and act as Lewis base. According to known experimental data, disphosphonic acids with both phosphonate groups bound to the same carbon atom in the carbon backbone form the most stable complexes. This aids in the functionality of the HEDPA anion as it is free to attack a metal ion with an oxidation state of (II), (III), or higher. It has been found that the stoichiometric ratio of a lanthanide HEPDA complex was 1:3 in highly acid solution thus forming Ln $(III)H_2X_3$ complex ($X^{2-}$ is the double deprotonated diphosphonic species). This is derived by assuming that the complexation is monodentate, bidentate, and mixed mono and bidentate.

Ideally, the decontamination agent should be 1) water soluble, 2) able to remove, dissolve, and form stable complexes with scales and contaminants, 3) amenable to isolation from the system and safe disposal, 4) recyclable, 5) essentially benign to metal substrate, and 6) compatible with coolant water chemistry. HEDPA has many chemical properties that make it an ideal decontamination agent for removing scale or films deposits as well as free actinides and fission products from solution. This decontamination agent can be utilized to decontaminate steels, iron-based alloys, metals, or other structural materials e.g., concrete from commercial PWRs and BWRs to DOE, Department of Defense (DOD), and private industry applications such as naval submarines, nuclear process lines, fuel basin pools, reprocessing facilities, storage racks, evaporators, chemical processing skids, control rod assemblies and mechanisms, and laboratory equipment that has become contaminated or corroded. It should be noted that HEDPA is representative for a class of diphosphonic acids disclosed in the various Horwitz et al. '894, '142 and '531 patents which are applicable to the present invention. Use of HEDPA hereafter is merely short hand for these diphosphonic acids disclosed in the '531 patent. More specifically, the useful phosphonic and diphosphonic acids are categorized by, $RCH_2PO_3H_2$ and $RCH(PO_2H_2)_2$, wherein R is an alkyl, aryl, substituted alkyl or substituted aryl group.

In previous studies for the decontamination of steels, it was customary to introduce a strong oxidizing agent as part of the decontamination process. The logic behind this is to disturb the protective surface created by the Cr in the steel or in the chromium oxidized rich surface layer. The oxidizing agent (such as potassium permanganate) oxidizes the Cr to a higher valency which increases its solubility.

In the present invention, the reducing agent is used to accelerate the dissolution of iron oxides. In mechanistic studies, it has been shown that the dissolution rate of iron oxides is proportional to the concentration of reduced iron raised to a power. Therefore, the addition of a reducing agent increases the divalent iron concentration thereby increasing the dissolution rate.

SFS is the preferred reducing agent and is short hand reference for both reducing and oxidizing agents such as $Na_2S_2O_4$, $Na_2SO_3$, ascorbic acid, zinc metal or other applicable zero valent metal, metal salts or oxides, such as $SnCl_2$, $Fe(NO_3)_2$, hydroxylamine nitrate (HAN), and $H_2O_2$ to name a few. Oxidizing agents may still be desired to condition the chromium containing oxides for dissolution. Such oxidizing agents are alkaline permanganates or permanganic acid among others which serve to oxidize trivalent Cr to hexavalent Cr.

Four major areas were investigated to establish the best system and mechanism for decontamination and separation of the metal ions using HEDPA. The four areas were: (1) dissolution of iron oxides in solutions of different systems and the concentration of iron-phase (2) kinetics involved in the dissolution process of different systems (3) a bulk recovery of metals as a precipitate from solutions and (4) a "recovery" step test for removing low aqueous concentrations of Fe from solution. The format for the tests that were performed was first to establish the characteristics of pure oxide dissolutions using HEDPA, evaluation of surface oxide dissolutions from actual ferrous specimens, and spent (waste) liquor treatment.

The inventive process is based on using HEDPA (or its equivalent as set forth above) solutions to dissolve the oxide scales and film containing contaminants on equipment either alone or in combination along with waste treatment processes not heretofore mentioned in the prior art, specifically the various Horwitz et al. patents or the Waller et al. patent cited herein. The dominant scale material is composed of iron and iron-nickel-chromium oxides in PWR and BWR systems. The use of HEDPA based nuclear reactor decontamination solutions and subsequent waste treatment scenarios is novel.

In the scaled-up process the spent HEDPA solution containing dissolved scale components is removed from the contaminated facility (e.g., reactor coolant pipes, liquid waste storage tanks, submarine hulls) and treated to reduce disposal volume and recycle the unused HEDPA. In reactor systems, the decontamination solution needs to be compatible with the reactor water chemistry during outages (as is within the skill of the art) since it is at this time when decontamination is performed. There are currently two philosophies regarding cycling of the decontamination solution through a contaminated system—once-through and recirculating. Once-through processing is favored if a significant quantity of suspended solids is present during the decontamination, because the suspended material can be caught in dead legs or bends in the piping and contribute to "hot spots" if the solution is allowed to recirculate. Recirculating systems are reserved for decontamination processes that completely dissolve the scale material. Recirculating systems make much more efficient use of the decontamination solution and are preferred systems for many applications. HEDPA based solutions can be run in a recirculating system. HEDPA solvent regeneration can be implemented such that the degradation products of HEDPA (e.g. phosphoric acid) would be removed via ion exchange or solvent extraction. The HEDPA left in solution would then be free to recirculate in the system. Additional HEDPA to replenish that lost to degradation can be added at this time.

In FIG. 1, a general schematic diagram of the HEDPA process is illustrated. We designated a recirculating in the system using HEDPA solutions (e.g., reactor coolant loops) which are removed once a satisfactory decontamination factor (DF) has been achieved or the solution is saturated (either in a feed-and-bleed format or completely removed). This DF can vary greatly depending on the system but a DF of 6 to 15 is sufficient for most reactor coolant systems. The spent HEDPA solution is then treated to reduce the waste volume and stabilized. This entire HEDPA treatment process in new with respect to the known prior art.

Volume reduction refers to processes that physically or chemically remove innocuous or non-target components (solvents, solutes, precipitates, colloids) from a waste stream in order to reduce the volume necessary for treatment, recycling, or disposal.

When the HEDPA solution has reacted with metal oxides we have discovered it is possible to form a precipitate upon evaporation of the liquid with possible reuse of the evaporated liquid. If the HEDPA solution has not been sufficiently reacted, evaporation will yield a thick polymerized residue.

Stabilization of the waste form is a general term used to describe processes that isolate physically and/or chemically hazardous or radioactive materials from environmental migration or human contact/exposure. Examples include vitrification, sintering, and grouping.

Initially, iron oxide powders were used to determine the kinetics for dissolution using different HEDPA-reducing agent combinations. From this data, expectations and limitations could be better qualified for testing of actual corroded samples. In previous work, the dissolution of goethite (FeOOH), Fe in trivalent form, was studied by Renato et al. Dissolution followed first order kinetics of the form $$ln(1-\alpha) = -kt \quad (9)$$

where the fraction of oxide dissolved at time t, and k is the characteristic rate constant in units of inverse time. With 1.0 M HEDPA at 80° C. the dissolution proceeded slowly reaching dissolution of ½ the goethite in 190 min ($t_{1/2}$=190 min). By addition of 0.1 M SFS to 1.0 M HEDPA, the reaction proceeded much faster, $t_{1/2}$=49 sec. Being one of the most difficult of the iron oxides to dissolve, we expected dissolution of prominent iron bearing scales typical of nuclear reactor facilities to be quick as well.

Powdered magnetite was studied to determine qualitatively the dominant reagents in the dissolution. Table 3 provides a summary of the results. The importance of the strong reducing agent SFS is apparent. Without SFS, 0.05 M and 0.5 M HEDPA dissolves magnetite in 50 min and 32 min, respectively at 50° C. Adding 0.005 M SFS decreases the dissolution time to 8 min and 9 min, respectively. If loading of the HEDPA solvent is not a problem then it is best to use a low concentration of both the HEDPA and SFS as the dissolution time will be very quick for scales composed of magnetite deposits.

TABLE 3

Time for complete dissolution of 0.1 wt % Fe (as magnetite) in HEDPA solutions at 50° C.

| HEDPA (M) | SFS (M) | Dissolution complete[a] |
|---|---|---|
| 0.05 | — | 50 min |
| 0.05 | 0.005 | 8 min |
| 0.5 | — | 32 min |
| 0.5 | 0.005 | 9 min |

[a] ± 10%

Hematite ($Fe_2O_3$) was dissolved in 0.5 M HEDPA with and without SFS present at 50° C. Using 0.5 M HEDPA without SFS the hematite appeared to not dissolve appreciably after 8 hr. Using 0.5 M HEDPA/0.005 M SFS, it took about 105 minutes to reach complete dissolution of 500 mg/L of Fe (as $Fe_2O_3$).

Figure 2:
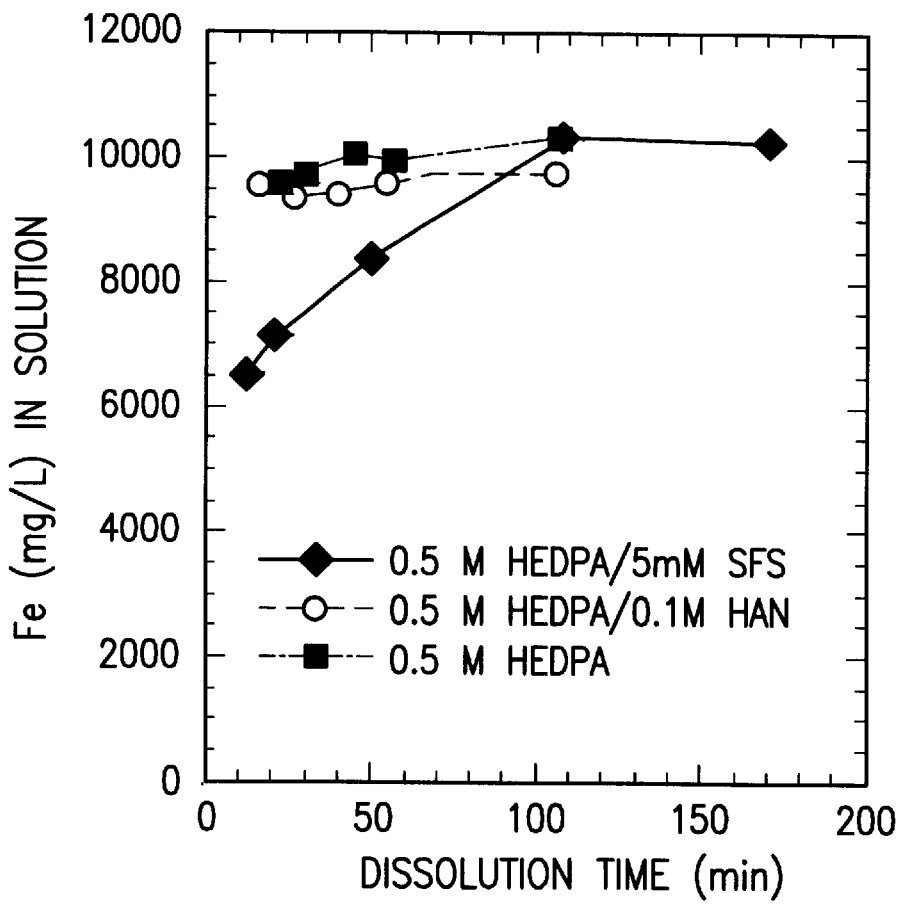
FIG. 2 is a graphical representation of the dissolution of Fe (as $Fe_3O_4$) in 0.5 M HEDPA solutions.
Figure 3:
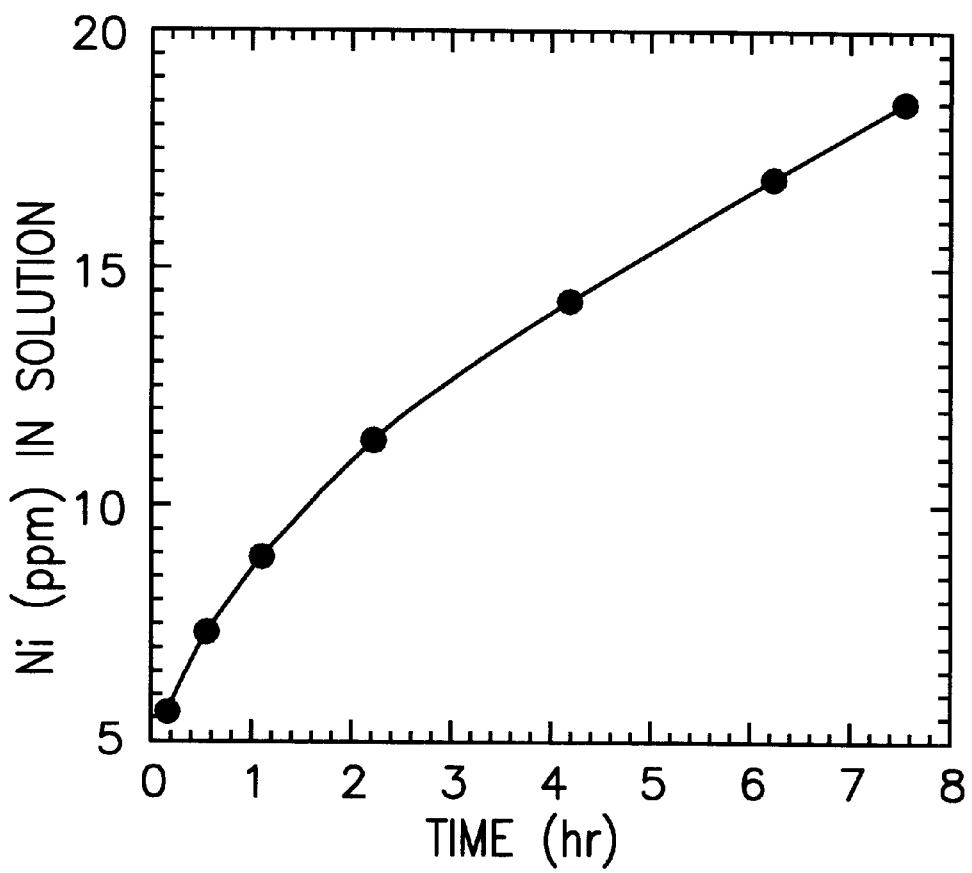
FIG. 3 is a graphical representation of the dissolution of nickel ferrite ($NiFe_2O_4$) in) 0.5 M HEDPA/0.005 M SFS at 50° C.

The spinel structures of nickel ferrite ($NiOFe_2O_3$) are very stable and constitute one of the toughest scales to dissolve selectively. The dissolution kinetics was investigated using 0.5 M HEDPA/0.005 M SFS at 50° C. (see FIGS. 2 and 3). The rate constant was $7.2 \times 10^{-5}$ $s^{-1}$ corresponding to a theoretical $t_{1/2}$=160 min.

The Horwitz et al. and Waller et al. patents teach the use of a synergistic mixture of HEDPA and reducing agent such as SFS in the dissolution of FeOOH, goethite. We have shown that this synergistic mixture is not necessary when dealing with such surfaces as corroded carbon steels, iron, and magnetite. Evidence that a synergistic mixture of HEDPA and SFS is not always required is given in Table 4, as Example 1. In Table 4, it is shown that the iron oxide, magnetite, (concentration equal to 2% iron in solution) will dissolve readily in HEDPA solutions of 0.5 and 1 molarity at temperatures ranging from 25° C. to 90° C. (rows 13–17). At lower molarity (0.1 and 0.05), the iron oxide does not completely dissolve and the solution will produce a precipitate if the temperature is raised to 50° C. Note: no SFS was used in these experiments. Similarly, we demonstrated the dissolution of iron oxide layers formed on corroded boiler tubes composed of carbon steel (low alloy steel) mainly of iron in Example 2. (Table 5)

TABLE 4

Dissolution observations using HEDPA at various molarities with and without SFS reductant and at various temperatures.

| Row # | HEDPA (M) | Wt % Fe | Temperature (° C.) | Time exposed (hr) | observation |
|---|---|---|---|---|---|
| 1 | 0.5 | 0.1 | 25 | overnight | Faint yellow, all dissolved |
| 2 | 0.5 | 0.5 | 25 | overnight | Faint yellow, all dissolved |
| 3 | 0.5 | 1 | 25 | overnight | y, all dissolved |

TABLE 4-continued

Dissolution observations using HEDPA at various molarities with and without SFS reductant and at various temperatures.

| Row # | HEDPA (M) | Wt % Fe | Temperature (° C.) | Time exposed (hr) | observation |
|---|---|---|---|---|---|
| 4 | 0.5 + 0.1M SFS | 0.1 | 25 | overnight | colorless, all dissolved |
| 5 | 0.5 + 0.1M SFS | 0.5 | 25 | overnight | colorless, all dissolved |
| 6 | 0.5 | 1 | 60 | overnight | Bright yellow, all dissolved |
| 7 | 0.5 + 0.005M SFS | 1 | 60–67 | overnight | Bright yellow, all dissolved |
| 8 | 0.5 + 0.1M SFS | 1 | 64 | 1.5 hrs | y-ybrown, white ppt. |
| 9 | 0.5 + 0.005M SFS | 1.5 | 60–64 | overnight | o-b, all dissolved |
| 10 | 0.5 + 0.1M SFS | 1.5 | 60–64 | 2 hr | B, white ppt. |
| 11 | 0.5 + 0.1M SFS | 1.75 | 65 ± 5 | overnight | White ppt |
| 12 | 0.5 + 0.1M SFS | 2.0 | 65 ± 5 | overnight | White ppt |
| 13 | 1 | 1.96 | 25 | 24 | Powder converted to $Fe(OH)_3$ |
| 14 | 1 | 1.96 | 60 | 1 | r-y, all dissolved |
| 15 | 1 | 1.96 | 70 | 1.5 | r-y, all dissolved |
| 16 | 1 | 1.96 | 80 | 2 | r-y, all dissolved |
| 17 | 1 | 1.96 | 90 | 2 | r-y, all dissolved |
| 18 | 0.5 | 2.16 | 25 | 24 | Powder converted to $Fe(OH)_3$ |
| 19 | 0.5 | 2.16 | 70 | 1.5 | r-y, all dissolved |
| 20 | 0.5 | 2.16 | 80 | 2 | r-y, all dissolved |
| 21 | 0.5 | 2.16 | 90 | 2 | r-y, all dissolved |
| 22 | 0.1 | 1.96 | 25 | 24 | Black/brown solid |
| 23 | 0.1 | 1.96 | 50 | 1 | l-b with white ppt |
| 24 | 0.1 | 1.96 | 60 | 1 | l-b with white ppt |
| 25 | 0.1 | 1.96 | 70 | 1.5 | l-b with white ppt |
| 26 | 0.1 | 1.96 | 80 | 1 | l-b with white ppt |
| 27 | 0.1 | 1.96 | 90 | 1 | q-b with white ppt |
| 28 | 0.05 | 2.06 | 25 | 24 | Black/brown solid |
| 29 | 0.05 | 2.06 | 50 | 1 | l-b with white ppt |
| 30 | 0.05 | 2.06 | 60 | 1 | l-b with white ppt |
| 31 | 0.05 | 2.06 | 70 | 1.5 | l-b with white ppt |
| 32 | 0.05 | 2.06 | 80 | 1 | l-b with white ppt |
| 33 | 0.05 | 2.06 | 90 | 1 | l-b with white ppt | ppt = precipitate
r-y = red-yellow solution
l-b = light-brown solid
o-b = orange brown solution The Horwitz et al. '894 patent teaches in Examples 1–7 dissolution of FeOOH, goethite (50 mg), by 1 molarity HEDPA and 0.1 molarity SFS as the reductant for a total solution volume of 2 mL. Of importance, this mixture would produce a solution of ~1.6% iron (defined as mass iron/mass of HEDPA solution*100). This would not produce the precipitate because the HEDPA solution is not properly formulated to produce a precipitate in Examples 1–7 of the Horwitz '894 patent. We have found that one needs the equivalent of about 1% of iron for every 0.5 molarity of HEDPA and temperatures above ~60° C. with the presence of constant 0.1 molarity SFS. In other words, the Horwitz et al. '894 patent would not produce the precipitate unless an additional 0.4% of iron was dissolved in solution. Given this information and the data in Table 4, patent '894 would be operating under conditions equivalent to data rows number 2, 3, 6, 7 of Table 4, that is, complete dissolution of the iron oxide to form a clear yellow solution.

Example 1 teaches several important facts. First, it shows that Horwitz et al. '142 and '894 does not teach conditions by which a precipitate will form. Given the solution makeup, one would have to add an additional 0.4% of iron to the solution before precipitate conditions are reached. Most important is that because the Horwitz et al. process does not deal with waste treatment but rather with decontamination, Horwitz et al. would never want a precipitate to form which could deposit radioactive material inside equipment that is being decontaminated. HEDPA alone can dissolve magnetite appreciably from our experimentation. Up to at least 2.16% iron as magnetite can be dissolved in 0.5 molarity HEDPA in <2 hrs at 90° C. Addition of SFS accelerates this phenomenon of dissolution somewhat (Table 5). Table 5 shows data were the dissolution of magnetite was accelerated by the addition of SFS.

TABLE 5

Magnetite dissolution with HEDPA solution and 0.01M SFS at 25

| HEDPA (M) | Wt % Fe | Time exposed (hr) | observation |
|---|---|---|---|
| 1 | 2.05 | 3 | Complete dissolution, light brown color |
| 0.5 | 2.00 | 3 | Complete dissolution, light brown color |

Next, SFS at concentrations of 0.1 molarity can produce a precipitate if >1% of iron is dissolved in a solution of 0.5 molarity HEDPA. If less iron is dissolved (demonstrated by rows 4 and 5 in Table 4) then the solution changes color but no precipitate is formed. The next example provides evidence on how oxides different from goethite dissolve in a rapid manner without the requirement of the combination of material taught by the Horwitz et al. or Waller et al. patents.

EXAMPLE 2

Boiler tubes from a coal-fired power plant were obtained and sectioned. SEM revealed three different structure types—base metal and two oxide layers on the inside of a coal-fired power plant boiler tube. The oxide layer on the surface is composed of iron oxide (magnetite, $Fe_3O_4$) and is approximately 15 $\mu$m thick. There is a uniform transition between the inner most oxide layer found between the bulk metal and the surface oxide layer. The innermost oxide layer is mainly composed of iron oxide but less oxygen (estimated to be FeO) with a thickness of 20 $\mu$m. Insufficiently fast diffusion of oxygen may be the reason the innermost layer forms an oxygen deficient iron oxide. The base metal is the carbon steel. The experiment was to monitor the dissolution of the oxide layers while flowing 0.5 M HEDPA and 0.5 M HEDPA/0.005 M SFS each onto separate boiler tube sections. The boiler tube piece labeled 66-A was placed in a solution containing 0.5 M HEDPA and the boiler tube piece labeled 66-B was placed in a solution containing 0.5 M HEDPA and 0.005 M SFS. The two experiments were designed to determine if the reducing agent was necessary for the dissolution of spinel phases such as hematite that typically do not dissolve with HEDPA alone. Table 6 lists the metal concentration of sample 66-A as a function of time. The inhomogeneous appearance in sample 66-A is more evident, because this part of the tube was bent and it seems to have more stress on the surface.

TABLE 6

Inner and outer boiler tube surface (66-A) dissolution kinetics using 200 ml of a 0.5M HEDPA solution at 50° C. One ml aliquots were collected for atomic absorption measurements
Metal Concentration (mg/L)

| Sample # | Time exposed (min) | Fe | Cr | Mo | Ni |
|---|---|---|---|---|---|
| 1 | 1 | 394 | ND < 0.68 | ND < 2.50 | 1.55 |
| 2 | 5 | 416 | ND < 0.68 | ND < 2.50 | 1.88 |
| 3 | 10 | 778 | 0.95 | ND < 2.50 | 2.70 |
| 4 | 20 | 1590 | ND < 0.68 | ND < 2.50 | 3.10 |
| 5 | 60 | 3650 | ND < 0.68 | ND < 2.50 | ND < 1.38 |
| 6 | 993 | 7850 | 0.70 | ND < 2.50 | 1.70 |

ND = not detected, below detection limits

The three major nonferrous elements Cr, Mo, and Ni were monitored and there is low dissolution of these metals compared to iron. Table 7 lists the metal concentration of sample 66-B as a function of time. For chromium there was no observed dissolution, while the nonferrous elements Mo and Ni showed slight dissolution at higher reaction times. The concentration of iron increases until reaching saturation and causing precipitation to occur. The dissolution rate determined for sample 66-B ($3.11 \times 10^{-3}$ $min^{-1}$) show no significant deviation from that without SFS. However, no further dissolution was observed. Weight loss for the sample is in the same region as the 66-A piece, potentially due to similar oxide dissolution and from the dissolution rates. Thus, it can be inferred that there was no SFS dependency on the oxide dissolution. In fact, the solution that had SFS did not clear up (i.e., the gas evolution seemed to cause the solution to be opaque) when the pieces were removed, in comparison to the solution that only had HEDPA. Therefore, we attribute insolubility of the solid phase in solution to the SFS since the other solution only had HEDPA in it. So for dissolution of boiler tube corrosion layers it was more appropriate to not include a reducing agent such as SFS in solution I of a 0.5 M HEDPA/0.005 M SFS solution at 50° C. One ml aliquots were collected for atomic absorption measurements.

TABLE 7

Metal Concentration (mg/L)

| SAMPLE # | Time exposed (min) | Fe | Cr | Mo | Ni |
|---|---|---|---|---|---|
| 1 | 1 | 31.3 | ND < 0.68 | ND < 2.5 | ND < 1.38 |
| 2 | 5 | 179 | ND < 0.68 | ND < 2.5 | 1.40 |
| 3 | 10 | 292 | 0.95 | ND < 2.5 | ND < 1.38 |
| 4 | 20 | 521 | ND < 0.68 | ND < 2.5 | 2.48 |
| 5 | 60 | 1580 | ND < 0.68 | 2.8 | 4.75 |
| 6 | 975 | 6580 | ND < 0.68 | 3.5 | 29.5 |

ND = not detected, below detection limits

In addition to using SFS as a strong reductant we have used HAN. Other reductants (Table 8) and oxidants ($H_2O_2$) may accomplish the same task, given that we have found that the destruction of HEDPA by the reductant or oxidant and the dissolution action is responsible for the precipitation.

TABLE 8

Precipitation Reactions at 70° C. using Various Oxidant Agents

| Name | Oxidant | Mass (g) or Vol. (mL) | 0.5M HEDPA* | 0.75M HEDPA** |
|---|---|---|---|---|
| potassium dichromate | $K_2Cr_2O_7$ | 5 | Heavy light green ppt | Light green ppt |
| potassium persulphate | $K_2S_2O_8$ | 5 | ND | ND |
| potassium chlorate | $KClO_3$ | 5 | ND | ND |
| potassium perchlorate | $KClO_4$ | 5 | ND | ND |
| sodium hypochlorite | KOCl | 5 | ND | ND |

*25 mL and 1.2 wt % iron
**25 mL and 1.5 wt % iron
ND = no reaction

It is important to note the precipitate obtained by our invention is of an unexpected composition that is amenable to waste formation. If the HEDPA is not degraded a gel is produced and not a solid precipitate. It would be expected that upon evaporation of the HEDPA-Fe solution, an HEDPA-Fe salt would form. However, we found that although we evaporate to take advantage of a well-known method of producing a solid, we do not form an Fe-HEDPA salt. Because of the unique properties of HEDPA, we found that evaporation will yield a more durable iron phosphate solid. In fact, simple evaporation of a dilute solution of metal in HEDPA (approximately <0.01–0.1 wt % metal in 0.05–1 molarity HEDPA) would yield a thick gel. Disposal or handling of such a material is difficult. Thus, evaporation is not an obvious method of waste processing and unless the proper proportions (Example 3) of metal oxide are dissolved in an HEDPA solution, thereby effectively degrading the HEDPA, a precipitate will not form upon evaporation. See examples 4 and 5 below.

EXAMPLE 3

Three solutions of HEDPA were prepared to study precipitation of iron as shown in Table 9.

TABLE 9

HEDPA and 0.1M SFS based solutions for Precipitation Studies

| Solution # | HEDPA (M) | $Fe_2O_3$ (g/l) | Fe (wt %) | Final Acid (M) | pH |
|---|---|---|---|---|---|
| 1 | 0.5 | 17 | 1.17 | 0.15 | 1.43 |
| 2 | 0.75 | 20 | 1.47 | 0.58 | 1.26 |
| 3 | 1.0 | 56 | 1.95 | NA | 2.04 |

*based on $Fe_2O_3$
NA = not available 0.5 M HEDPA and 0.1 M SFS Mixture

Approximately 0.5 M HEDPA and 0.1 SFS solution was prepared and put into a jacketed rector, at a temperature of 70° C. with air agitation. The solution was treated with 52 grams (2.89 moles) of hydrogen peroxide $H_2O_2$, and produced 32.63 grams of a yellowish-white precipitate; presumably iron phosphate ($FePO_4$). If the precipitate was $FePO_4$, the equivalent weight in iron is 12.08 g. Since 17.49 g of iron (25 g $Fe_2O_3$) were used to prepare this solution, we recovered 69% of the iron. This is reasonably consistent with the Atomic Absorption analysis results that show an initial concentration of iron of 11,400 ppm, and a final concentration of 4360 ppm, for a recovery of 62% iron. The remaining concentration in solution is high but can be addressed by polishing methods.

Solid Phase Analysis

The yellowish-white precipitate was further studied using SEM to identify the mineral phase. The result of EDS on the yellowish-white precipitate believed to be some type of iron phosphate compound.

Liquid Phase Analysis

Figure 7:
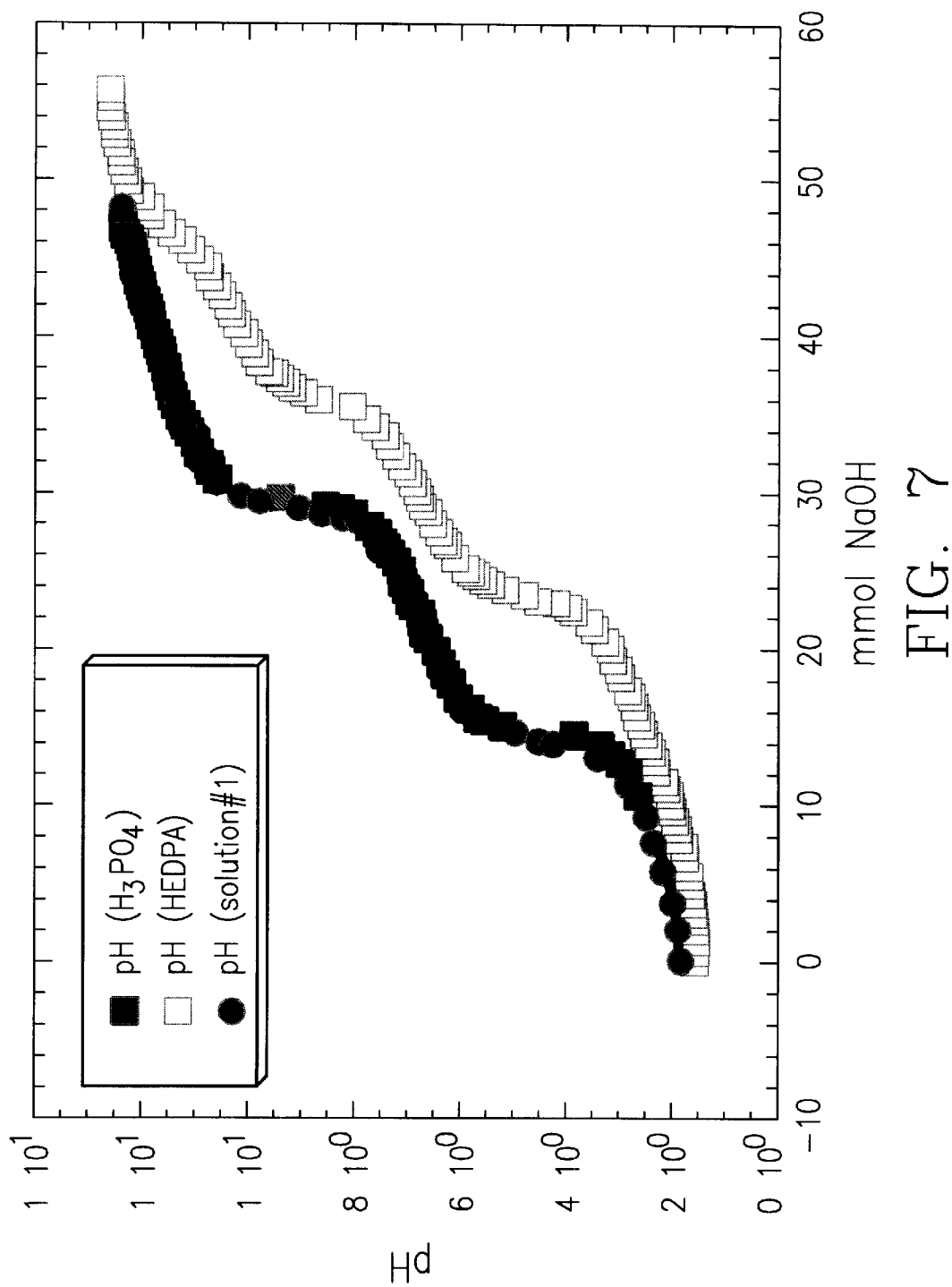
FIG. 7 is a graphical representation of the neutralization of HEDPA solution after precipitation and normalization and titration of 0.5 M HEDPA and 85.7% phosphoric acid.

The titration of the remaining acid solution gives an equivalence point for the first proton occurs at a pH of 4.07 and a concentration of 0.149 M of acid, see FIG. 7 which shows the neutralization of HEDPA solution after precipitation and normalized and titration of 0.5 M HEDPA and 85.7% phosphoric acid.

In which case we find an approximate value of $pK_{a1}=2.34$ for the first dissociation of the acid, and a $pKa_2=6.77$ for the second dissociation and 12.1 for the third dissociation. Although the $pk_a$ values of solution #1 do not correspond exactly to the ones of phosphoric acid, the values are sufficiently close, to assume the presence of phosphoric acid.

An explanation to this difference in curve shape, is believed to be that the HEDPA molecule breaks down into two separate phosphoric acid groups, plus other organic decomposition products.

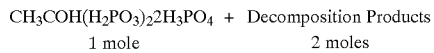

$CH_3COH(H_2PO_3)_2 2H_3PO_4$ + Decomposition Products
1 mole                          2 moles That is, a 1 M solution of HEDPA, without any metal, renders after break down, a 2 M solution of phosphoric acid. A consequence of this HEDPA decomposition is that when calculating the final acid concentration for the solutions after precipitation, we have to divide the molarity found, by two, if we wish to express the acid concentration in terms of the original acid. In the case for solution #1, we find a final acid concentration of 0.149 M. In contrast, the tritration curve for concentrated phosphoric acid shows an equal spacing between inflections. Here, we observe three nearly horizontal regions, corresponding to the three protons in $H_3PO_4$. The $pK_a$ for the first dissociation is approximately equal to 2.2, 6.8 for the second, and approximately 12.0 for the third.

This reaffirms the likelihood of the supernatant conversion to phosphoric acid.

0.75 M HEDPA and 0.1 M SFS

When 1.5 liters of 0.75 M HEDPA and 0.1 M SFS (Solution No.2) were reacted in a similar way to solution No. 1, no precipitate was obtained. We added a total of 1.41 moles of $H_2O_2$ (30%) at a temperature of 70° C. The temperature was raised to 80° C. and 1.32 moles of $H_2O_2$ were added. The concentration of $H_2O_2$ was increased to 50%, adding 0.88 moles, but again, no precipitate was obtained. There was some precipitate however, on the walls of the reactor at the top of the solution. In order to investigate the possibility of this solution not precipitating by an excess of free HEDPA, we took 10 ml of this solution and saturated it with magnetite $Fe_3O_4$ (which dissolves readily). It forms a syrupy dark green liquid. But no precipitate was formed after adding an excess of 50% $H_2O_2$. However, the bulk of the solution precipitated by diluting the solution 10 to 1 with water, at room temperature. When the supernatant was taken to 63° C., more precipitate is formed. The total precipitate obtained was 24.21 grams. If the precipitate is iron phosphate ($FePO_4$), this is equivalent to 9.0 g of iron, or 12.87 g of hematite ($Fe_2O_3$). This would give us a recovery of 42.9% of iron.

An excess of acetic acid in the reaction mixture might explain the lack of precipitation of iron phosphate in this solution. According to Appelman et al., there are two concurrent routes for the decomposition of HEDPA by $H_2O_2$:

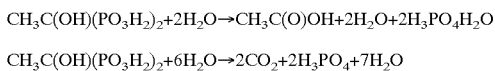

$CH_3C(OH)(PO_3H_2)_2+2H_2O \rightarrow CH_3C(O)OH+2H_2O+2H_3PO_4H_2O$ $CH_3C(OH)(PO_3H_2)_2+6H_2O \rightarrow 2CO_2+2H_3PO_4+7H_2O$ Acetic acid can react to form ferric acetate; this ferric acetate in solution might prevent the precipitation of iron phosphate by increasing its solubility. The presence of acetic acid can also explain the precipitation by dilution and heating, and the precipitate observed on the walls of the top of the reactor. The thin film formed on the walls of the top of the reaction vessel, offers a high surface area that facilitates the evaporation of acetic acid, leaving the iron phosphate free to precipitate.

The back tritration curve for the supernatant of this solution is practically identical to the back tritration curve for the supernatant of solution #1. The equivalence point for the first proton occurs at a pH of 4.26. We find an acid concentration of 0.58 M calculated as HEDPA.

1.0 M HEDPA and 0.1 M SFS

Two liters of 1.0 M HEDPA and 0.1 M SFS (Solution #3) was reacted in a similar way to solution #1 and #2, a total of 3.73 moles of $H_2O_2$ was added at 70° C., but no precipitate was obtained even after diluting the solution 20 to 1 with water.

The above results for solutions 1, 2 and 3 seem to be consistent with the decomposition reactions proposed earlier. That is, the higher the proportion of HEDPA to water, the higher the tendency to form acetic acid and prevent precipitation of iron phosphate.

EXAMPLE 4

As Example 4, solid samples generated from the evaporation of 0.5 molarity HEDPA with 1% of iron as magnetite dissolved in solution were analyzed by x-ray diffraction (XRD). Samples were evaporated in an oven at various temperatures (60° C. and 80° C.) to dryness. Both solid samples showed no significant difference in their XRD patterns. From peak analysis the dominant species were $FeH_9(PO_4)_4$, $FeH_2P_3O_{10}*H_2O$, and $Fe(H_2PO_4)_2*2H_2O$. The data suggests that if the evaporation were to occur from a less acidic solution, purer iron phosphate phases (as opposed to hydrogen iron phosphates) could be obtained

EXAMPLE 5

Analysis by scanning electron microscopy and energy dispersive x-ray spectroscopy (EDS) was completed. The EDS data showed that the precipitate formed after addition of SFS to a concentration of 0.1 molarity (see row 8 of Table 4) was dominated by phosphorus, iron and oxygen. Using semi-quantitative analysis, the iron:phosphorus ratios was 1:1 approximately, as would be expected for iron phosphates. Fe-HEDPA complexes would be expected to have ratios of 2:1 in iron.

Therefore, we found that by using evaporation of the HEDPA-iron solution when the solution contains appropriate amounts of dissolved iron or measures are taken to destroy the HEDPA molecule to its degradation products, one can produce a metal phosphate solid.

We have found a precipitate can be formed by addition of ion exchange resins of acidic or basic type, an unexpected result given that ion exchange resins are used to remove dissolved ionic constituents from solution and not to produce a precipitated solid. Treatment by ion exchange material will not produce the usual effect because the stability constants for HEDPA and polyvalent metals are very large. In fact, these complexes are so stable that there is no practical method of partitioning the metals from their complexed state with HEDPA. Therefore, the practice of ion exchange or solvent extraction to remove the Fe from its bound state is known to be futile. However, separation of monovalent cations such as Cs is possible because of the low affinity of HEDPA for Cs. It was known that Eu dissolved in HEDPA solutions formed anionic complexes with the Eu coordinated by three HEDPA molecules. It is known that Eu and Fe behaved similarly in solution and that one may separate the Fe-HEDPA anionic complex via anionic exchange. By this method, one could selectively remove bound Fe and therefore reuse HEDPA. This would be an attractive method for HEDPA recycling as well as traditional metal separation.

EXAMPLE 6

In our laboratory we found that treatment of an HEDPA-dissolved iron solution with solvent extractants produced a prohibitively low partitioning coefficient ($K_d$<100 mL/g) for actinides. A similar result was produced when americium were dissolved in 0.5 M HEDPA and treated with CMPO coated magnetic particles. However, in recovering Cs we found that magnetic particles coated with crystalline silicotitanates could efficiently remove Cs from solution. Table 10 presents the data.

TABLE 10

Partitioning coefficient for extraction of Cs (-112-1,2) and Am (-112-3,4) from 0.5M HEDPA and 0.1M SFS solutions. Radioactive tracer added as Cs-137 and Am-241.

| ID | type | mass | Initial cpm | Final cpm | $K_d$ (mL/g) |
|---|---|---|---|---|---|
| 1660-112-1 | MACS-CST | 0.0515 | 3793 | 123 | 1700 |
| 1660-112-2 | MACS-CST | 0.0508 | 3793 | 136 | 1600 |
| 1660-112-3 | MACS-CMPO | 0.0507 | 7174 | 6971 | 1.7 |
| 1660-112-4 | MACS-CMPO | 0.0503 | 7174 | 6933 | 2.1 |

Such low partitioning coefficients for polyvalent cations indisputably demonstrates that such a process is absolutely futile as a method of treating the HEDPA solution for recycling purposes.

The next set of experiments where completed to try to take advantage of the anionic complexes form between HEDPA and polyvalent metals. We chose to use an anionic exchange resin DOWEX1X4-400 chloride-type exchange resin (Table 10). It appears that the ion exchange material catalytically degrades the HEDPA after which the degradation products and metal combine to form a precipitate instead of performing an ion exchange reaction. The anion resin and the HEDPA solutions formed a fine, white precipitate similar to those found during the decomposition of HEDPA with SFS. This was presumably a result of the partial degradation of the HEDPA by the resin and the formation of Fe-phosphorus precipitate in the presence of the resin. Normally this would be considered a detriment to processing since the concept goal was to remove the iron via ion exchange mechanisms. Precipitate formation would lead to clogged ion exchange columns and downtimes without achieving separation. DOWEX1x4-400 resins were used in both untreated and pretreated forms (with HEDPA). The DOWEX resin and the HEDPA solutions formed a fine, white precipitate. There was a strong presence of P, Fe, Cl, and O by EDS analysis. The P/Fe ratio was larger than in the SFS promoted precipitation experiments shown previously, suggesting more substantial poly-phosphate forms of the present precipitates. XRD analysis could not confirm the exact phases of iron phosphate and suggested a strong amorphous presence.

TABLE 11

Reduction of Fe via precipitation in 0.5M HFDPA solutions using DOWEx 1x4-400 anion exchange resins. Fe solutions (mg/L) of 10 mL were mixed with 0.1 g of resin for 22 hr at 25° C.

| Initial Fe concentration | % Fe removed | % Fe removed, 0.5 M NaCl added |
|---|---|---|
| 50 | 51 | NM |
| 100 | 60 | NM |
| 500 | 64 | 12 |

In the next set of tests, reducing agents were added to dilute Fe solutions to test the effect on removal with the DOWEX anion exchanger (Table 12). The addition of 0.1 M HAN to dilute Fe solutions had a small effect on Fe removal. A similar result was found with the solutions containing 0.1 M SFS although with slightly better success. The percent removal was 28% for a 500 mg/L Fe solution in 0.5M HEDPA/0.1M SFS.

TABLE 12

Reduction of Fe via precipitation in 0.5M HEDPA solutions using DOWEX 1x4-460 anion exchange resins. Fe solutions (mg/L) of 10 mL were mixed with 0.1 g of resin for 22 hr at 25° C.

| Initial Fe | % Fe removed, 0.1M HAN added | % Fe removed, 0.1M SFS added |
|---|---|---|
| 50 | NM | NM |
| 100 | 16 | 15 |
| 500 | 5 | 28 |

In the final set of tests, the DOWEX resins were preconditioned with HEDPA (Table 13) and yielded the most significant results of those of the anion exchange tests. With 1000 ppm Fe (in 0.05 M HEDPA) 81% of the Fe was removed. With the 100 ppm Fe solution (in 0.005 M HEDPA) the resins removed 98% of the Fe.

TABLE 13

Removal of Fe via precipitation in HEDPA solutions using DOWEX 1x4-400 anion exchange resins preconditioned with HEDPA. Fe solutions (mg/L) of 10 mL were mixed with 0.1 g of resin for 22 hr at 25° C.

| Stock solution | HEDPA (M) | % Fe removed |
|---|---|---|
| 1000 | 0.05 | 81 |
| 100 | 0.005 | 98 |

Similar results were found with tests with solutions containing HEDPA and HAN; a precipitate was formed when the DOWEX resins were added.

Thus, instead of removing the metal bound complex onto the ion exchange material through the ion exchange process, as was expected, the above conditions yielded a precipitate. Thus, unless the HEDPA is degraded almost completely (as shown in example 3), it will complex dissolved iron in solution and inhibit its extractability via conventional ion exchange practice. Thus, we found that the use of ion exchange resins promotes the further degradation of HEDPA and promotes precipitation formation. It should be understood that HEDPA may be degraded by the use of vanadium catalyst and peroxide.

To summarize, the dissolution of magnetite may be accomplished with reasonably fast kinetics with the use of HEDPA solutions alone without additional reducing agents. However, with oxides of the trivalent iron such as goethite, nickel ferrite, and hematite, the use of reducing agents is very effective in increasing the dissolution rates.

Stainless Steel Dissolution

An important expectation of HEDPA solutions is the specificity of the acid for oxide dissolution with minimal attack to the non-reacted/non-oxidized metal substrate. This would be expected provided the HEDPA is not a sufficiently strong oxidizing agent to oxidize the base metal. To test this belief, a 304 SS coupon was placed for five days at 75° C. in a solution containing 0.5 M HEDPA and 0.1 M SFS. From careful weight measurements and electron microscopy there was no apparent change to the surface. The dissolution rate for the coupon was determined to be <0.6 mg/cm$^2$/day.

Carbon Steel

A heavily corroded piece of AISI type 1010 carbon steel was tested. The extensive corrosion of the surface of the carbon steel sheet was brown-red in color and loose. This suggests the presence of predominantly amorphous hydrated $Fe_2O_3$ (as FeO and $Fe_3O_4$ is black and hematite, $Fe_2O_3$, will not dissolve in HEDPA alone). HEDPA alone (0.1 M) dissolved the surface oxide to reveal the clean base metal within 10 min at 60° C. A clear interface was obtained during the dissolution. An increase in the HEDPA and SFS concentration, 0.68 M HEDPA and 0.017 M SFS, did not noticeably increase the rate of dissolution.

LWR Steel

To test against strongly adherent oxide scales we obtained pieces of control drive housing mechanism from a commercial U.S. light water reactor. The pieces (type 347 stainless steel), were labeled Piece A and Piece B. Because these pieces were taken from the primary containment vessel, an appreciable neutron flux was present causing general activation of the components. Also, from historical data we know that there was a fuel cladding breach during a fuel transfer and that fission products and actinide fuels were leaked into the primary vessel. There is, in fact, evidence from gamma analysis of trace amounts of Am-241 on the drive housing. Piece A contained a variety of isotopes including Co-60, Sb-125, Ag-110m while Piece B activity was derived almost exclusively from Co-60. It was believed that because of the appreciable internal activation (mostly Co-60), it would not be possible to decontaminate these samples to the point of free release. Initially 1.0 M HEDPA/ 0.005 M SFS at 55±5° C. was attempted to remove the oxide layer from Piece A. After ~60 hr the matte finish was removed from the surface of Piece A revealing a shinier brown/black finish. The decontamination factors were computed for the radionuclides identified. The same procedure was followed for Piece B producing similar results, i.e., a noticeably shinier yet brown/black surface. The decontamination factors (DFs) for the particular radionuclides were between 1 and 3.5 for Piece A and 1.04 and 28 for Piece B. The largest DFs were obtained for Co-58 and Mn-54 g-emitter indicating that these were activated in the core and migrated to be incorporated in the outer film.

The decontamination factor is computed by dividing the initial radioactivity by the radioactivity following decontamination. The background radioactivity is subtracted from the initial and final activities as appropriate.

Based on the rate equation and results from our powder tests, we concluded the inner oxide must be composed mostly of a nickel/chromium rich spinel and would require an increase in $H^+$ or improved reduction of iron to produce decontamination within an acceptable time period. To this end we decided to increase the HEDPA and SFS concentrations; 2.56 M HEDPA/0.21 M SFS/0.15 M HAN was prepared at 85±5° C. After 24 hr an additional 0.46 M SFS and 0.15 M HAN was added for Piece A. HAN was used to depress the formation of precipitates presumably formed by the decomposition of SFS. An additional 0.4 M SFS and 0.15 M HAN was added for Piece B tests. Pieces A and B, respectively, showed the complete removal of the brown/ black oxide scale. For Piece A, the entire piece was shiny without any sign of surface film or scaling.

It was evident that within the constraints of our very low detection limits in our radioactivity counting system that the piece had been completely decontaminated of the surface oxides. The DF for suspected surface radionuclides of Eu-152, Sn-113, Sb-125, Ag-110m, Co-58, and Mn-54 are >7.8, >70, >79, >36, >111, and >16, respectively. The Cr-51, Fe-59, and Co-60 activity was reduced by a factor of 1.5 which is attributed to internal activation of the steel piece and the activity cannot be removed under any means short of complete dissolution of the entire piece. These three radionuclides are formed by the neutron activation of natural Cr-50, Fe-58, and Co-59, respectively.

Figure 4:
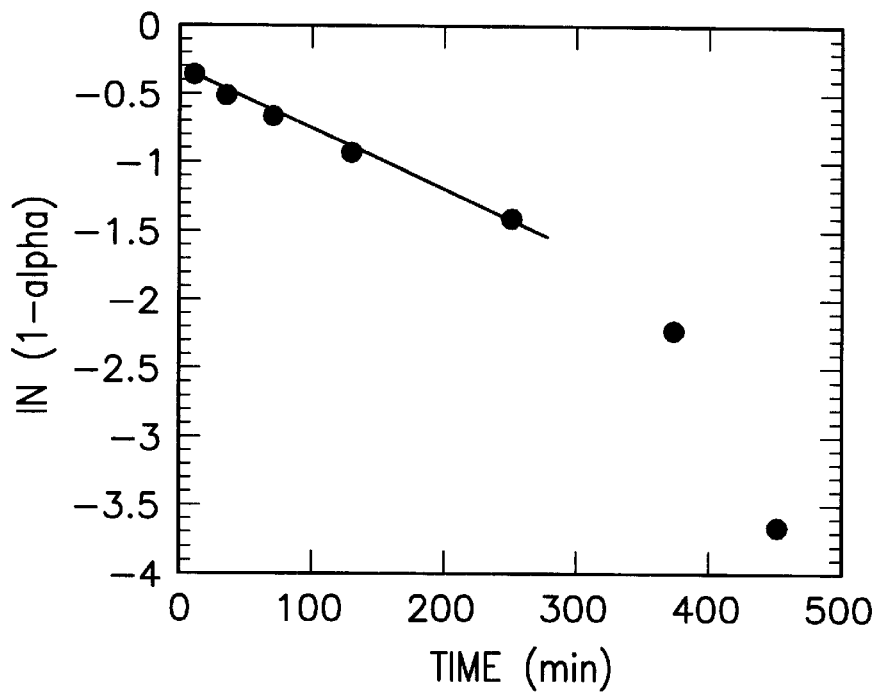
FIG. 4 is a graphical representation of the curve fit assuming first order kinetics in the dissolution of $NiFe_2O_4$ in 0.5 M HEDPA/0.005 M SFS at 50° C. The $k=7.2\times10^{-5}$ $s^{-1}$ fit the data well for t<300 min.

To show the contrast between a cleaned and original surface, only half of Piece B was submerged in the HEDPA/ SFS/HAN solution. One easily discerned (figure not shown) the interface line between the submerged and non-submerged fraction. Some oxide material was still seen on the cleaned fraction. From the gamma and visual characterization of Piece A and B, it is evident that the HEDPA decontamination solvent was very effective. The surfaces of the pieces are obviously cleaned of surface contamination leaving the background activation products as the sole source of radiation. This was verified by DF calculations, which were extremely large. Referring to FIGS. 4a and 4b, the removal of surface contaminants such as Co-58, Mn-54, Ag-110m and Sb-125 is shown. Moreover, internal neutron activation is evident from the Ta-182, Fe-59 and Co-60.

Waste Treatment

Waste treatment is the most important issue regarding the implementation of HEDPA solutions for decontamination. After decontamination activities, the spent liquor solution containing HEDPA, reducing agents, and dissolved metals and radioactivity must be treated and stabilized for disposal. The HEDPA, being of the thermally unstable chemicals (TUCS) family, will degrade under mild temperature and oxidizing conditions. We have found two methods to catalyze degradation and subsequent precipitation of HEDPA as a metal inorganic salt. The addition of SFS to 0.1 M to a solution of>few thousand ppm of dissolved iron caused a precipitate to form within 30 minutes at 80° C. The precipitate was not positively identified but according to x-ray diffraction analysis and energy dispersive spectroscopy, iron phosphates and sulfates (from SFS) may be dominant forms present. The iron remaining in solution was reduced by a factor of 2.5–5 depending on the initial Fe in solution by the precipitation method. The HEDPA precipitation reaction formed by the decomposition of HEDPA will produce a solution containing low but significant quantities of radioactivity, which will disallow free-release disposal.

When the dissolved iron/metal concentration exceeds about 7500 micrograms metal per gram of solution, SFS can be added to the solution to about 0.1 M which will create a precipitate in a timely manner (<few hrs).

Ion exchange material will produce a precipitate with any concentration of iron/metal in solution so in a situation where it is not possible to produce a precipitate with SFS (<about 7500 ppm metal in solution) or it is not practical, then an ion exchanger can be added. When none of the above is viable the precipitate can occur using an oxidation method such as $H_2O_2$.

After bulk reduction via the precipitation reaction described above, a cost-effective polishing step is required to reduce the radionuclides to levels allowable for reuse or for free discharge. It has been reported that the dissolution of FeOOH in HEDPA produced anionic complexes of europium and HEDPA. It is known that europium (III) and Fe (III) behave similarly. So, a strong base anion exchange resin was tested as a possible method for removing concentrations of iron dissolved in HEDPA. An interesting result was common in all the tests. The resin and the HEDPA solutions formed a fine, white precipitate similar to those found during the decomposition of HEDPA by addition of SFS, as described in the previous paragraph. Apparently the resins acted to catalytically destroy the HEDPA to allow for metal/phosphates to form. With 1000 ppm Fe (in 0.05 M HEDPA) 81% of the Fe was removed and 98% from a 100 ppm Fe solution (in 0.005 M HEDPA) upon addition of the strong base anion exchange resins. Since the fine precipitate that was created could not be separated from the exchange resins, we propose the use of magnetic anion exchange resins to effect this catalyzed precipitation and subsequent recovery of the resin via magnetic separation methods. In this way the resin material, attached to the magnetic particle support, can be recycled.

The final step is to remove any remaining low concentrations of radioactivity or metals from the supernatant. A polishing step that is well suited for this application is magnetically assisted chemical separation. This process disclosed in U.S. Pat. No. 5,468,456, the disclosure of which is incorporated herein by reference, utilizes micrometer-sized magnetic particles that are tailored for selective separation of hazardous/radioactive species from solution including lanthanides, fission products, and radioactivated products.

Various ion exchange resins other than strong base anion exchange resin are applicable to the invention, such as synthetic resins, gel-type ion exchangers, macroporous ion exchangers, isoporous ion exchangers, pellicular ion exchangers, partial inorganic ion exchangers, strong acid cation exchanger of the sulfonic acid, weak acid cation exchanger of the carboxylic acid, phosphorus and arsenic containing cation exchangers, inorganic ion exchangers, strong base quaternary ammonium anion exchangers, weak base anion exchangers of the amine type, solvent-extractant coated resins, magnetic ion exchangers, anion exchangers of the pyridine type, specific and chelate ion exchangers and cellulose, dextran, and agarose ion exchangers Another important method available for waste treatment is through simple evaporation and solidification. From our experiments we have documented that the spent liquor solution of HEDPA can be evaporated to form a white precipitate presumably of the phosphate form which may directly amenable to phosphate-based grout or glass.

Figure 5A:
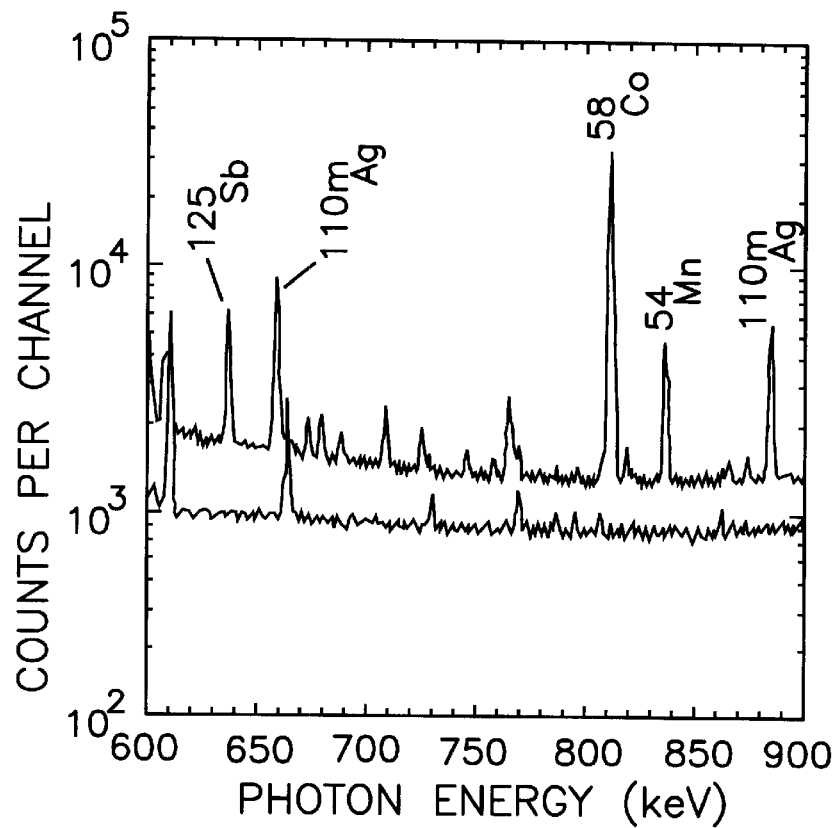
FIGS. 5*a* and 5*b* are graphical representations of gamma ray spectras of pre (5*a*) and post (5*b*) decontamination activity on the Piece A sample.
Figure 5B:
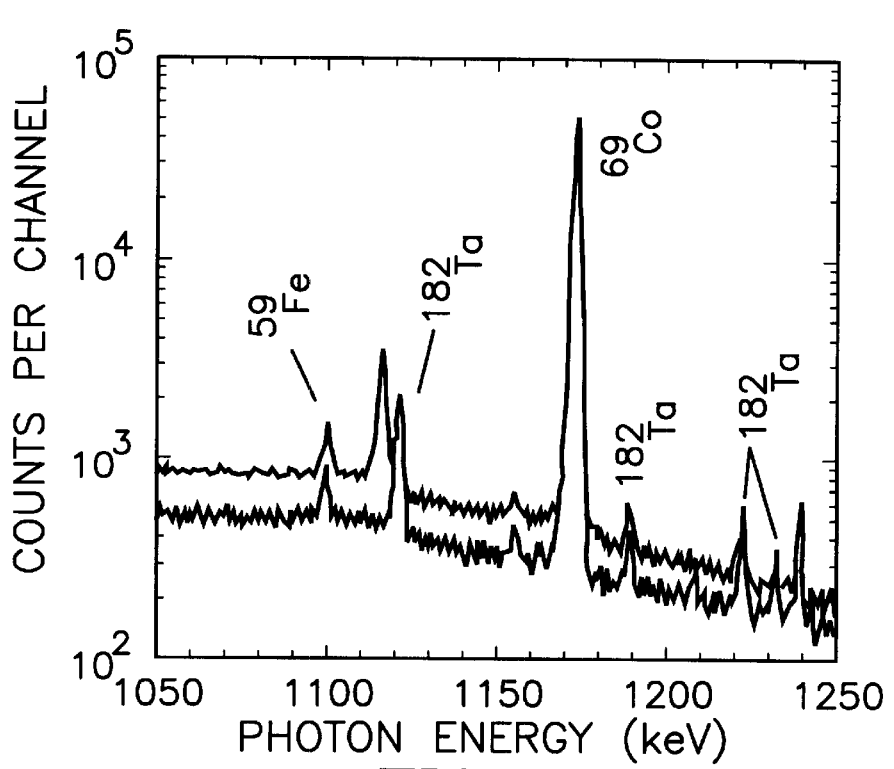
Figure 6:
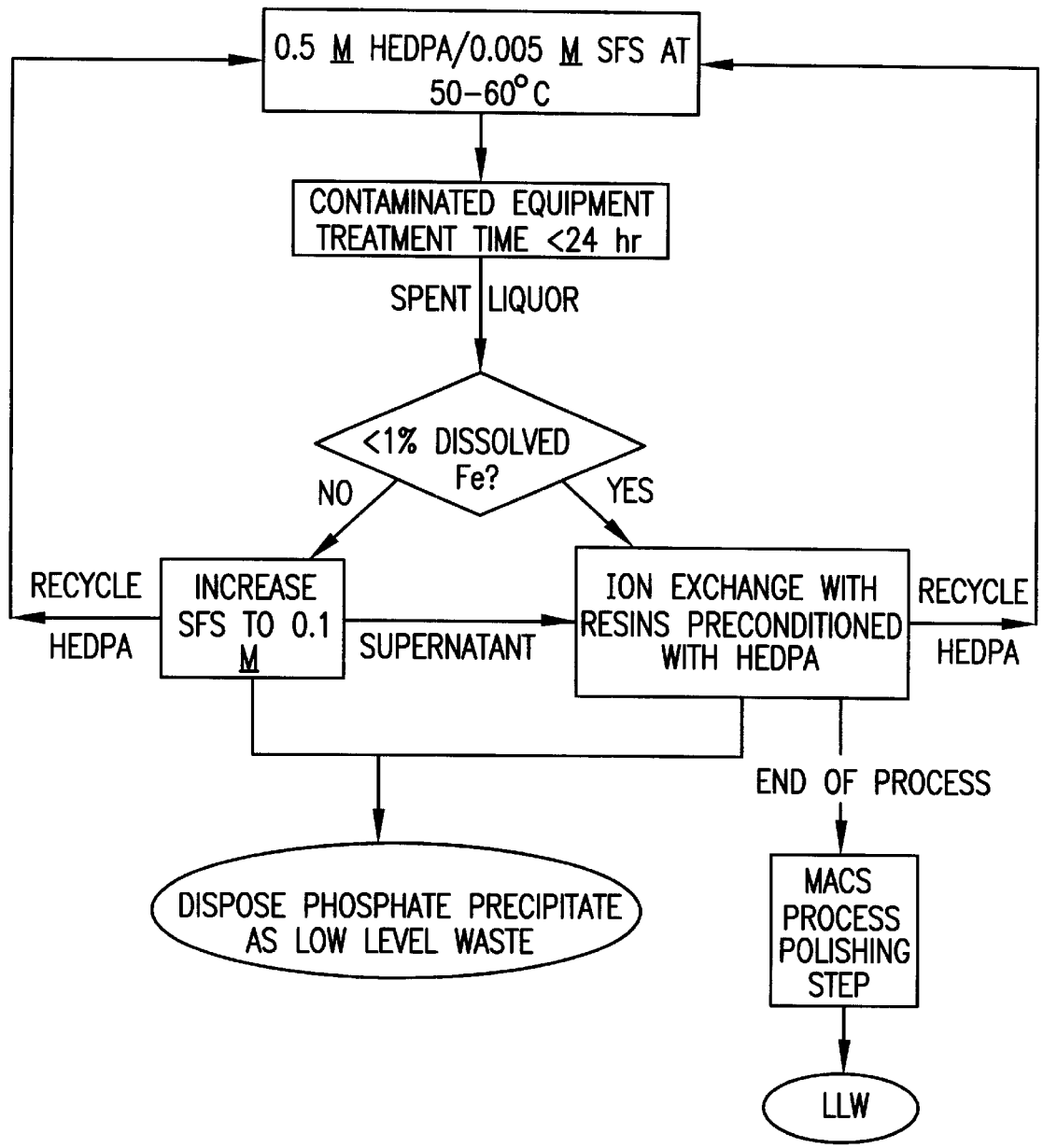
FIG. 6 is a schematic diagram of a closed loop cycle for the decontamination of ferrous metals using HEDPA/SFS solutions.

The waste treatment methods are crucial to acceptance and cost-effectiveness of this process. Depending on the situation we have devised several methods to treat the spent liquor—1) precipitation via SFS addition, 2) catalytic precipitation using magnetic ion exchangers, and 3) evaporation. Magnetic particles coated with selective ion exchange materials or solvent extractants will be used as a polishing step so that the waste solution can be released as non-radioactive waste. A diagram of the general process described in the patent is shown in FIG. 5.

The motivation of this invention is the full cycle (cleanup to final disposal) process based on the dissolution of metal oxides (ferrous and nonferrous) using diphosphonic acids and/or reducing agent and/or oxidizing agent, and treatment of the waste solution to minimize waste volume. It is true that the Horwitz et al. and Waller et al. prior art patents cover a wide range of dissolution scenarios with respect to diphosphonic acids (HEDPA), reducing agents, pH ranges, and inhibitors but the key item is that the back end of the process (i.e., waste processing) is not addressed ever in these patents. Horwitz and Waller patents are directed toward processes that dissolve metal oxides and the radioactivity associated with them, and do not concern themselves with the next step or teach the necessary requirements during the dissolution process such that one can avoid premature or unwanted precipitate formation or treat the waste to produce a final waste form product.

As seen, our invention utilizes the instability of the HEDPA molecule which degrades with high temperature (greater than about 200° C.) or combination of temperature, catalyst and/or additional reagent (e.g., oxidizing or reducing agent) such that degradation occurs at less than about 200° C. This characteristic has never been used as part of a process and was not taught prior to our invention.

Summarizing, HEDPA has a very strong affinity for metals in solution. Using an ion exchange material to remove the metals from their bound and dissolved state within HEDPA is not trivial and has not been shown before. In many systems in use today ion exchange is a chosen technique to remove the dissolved species from solution to recycle the reacting solution. For example, to decontaminate reactors under the DfD process (alkaline potassium permanganate), the dissolved metal oxides are removed from solution via ion exchange beds with satisfactory efficiency. However, there does not exist an ion exchange material that can effectively remove metals bound to HEDPA for the purpose of recycling HEDPA because of the tremendous affinity of HEDPA for the polyvalent dissolved metals which are of interest to this patent application. Thus, no one would attempt to use this technique as a method of HEDPA recycling or waste processing to recover uranium or plutonium species, as an example. In order to use ion exchange resins for the purpose of ion exchanging the dissolved metals on the surface of the resins, HEDPA must be degraded, to produce phosphoric acid, carbon dioxide, and water. Phosphoric acid solutions are appropriate for the effective use of ion exchange resins.

Of importance, although ion exchange resins cannot be expected to remove dissolved polyvalent metals from HEDPA solutions, one can use them to catalyze the degradation of the HEDPA and promote precipitation formation, as we have disclosed. In this manner, the ion exchange resins do not operate in an "exchange" mechanism, but as a medium that appears to catalyze the degradation of the HEDPA, thus forming a precipitate. We believe that many types of ion exchange resins can be used to catalyze the degradation of HEDPA and subsequent precipitation of the dissolved metal. We have found that addition of a reducing agent, in this case SFS, to an appropriately concentrated solution of metal oxide and HEDPA will yield a precipitate.

In addition, evaporation in many systems yields a solid salt material that can be disposed of readily. For example, one can remove iron oxides, as is practiced, from boiler tubes with treatment with hydrochloric acid. One can evaporate the reacted solution to produce an iron chloride salt or collect excess acid from the condensate, which can then be recycled. HEDPA does not evaporate to this degree. It is an aqueous soluble organic acid. Thus, it behaves in high concentration (i.e., when the free water has been driven out of solution by a technique such as evaporating the working HEDPA solution) like an organic liquid. Simple evaporation of a dilute solution of metal in HEDPA (approximately <0.01–0.1 wt % metal in 0.05–1 molarity HEDPA) would yield a thick gel. Disposal or handling of such a material is difficult. Thus, evaporation is not an obvious method of waste processing and unless the proper proportions of metal oxide are dissolved in an HEDPA solution, thereby effectively degrading the HEDPA, a precipitate will not form upon evaporation. Moreover, this precipitate is not of the HEDPA-metal salt but is an inorganic metal phosphate, an unexpected result, given that HEDPA degradation was not known prior to our invention.

In the non-nuclear industry there are components composed of nonferrous metals and alloys. For non-radioactive oxide scales, the goal of a cleaning solution is to remove the porous layer so that process efficiency can be restored. Examples include descaling an evaporator or heat exchanger and cleaning corroded bridges and tanks. In the first example, the effective heat transfer coefficient through the walls is improved by removing the scales, which operate as an insulator. Bridges and tanks are cleaned to remove salt products, increase aesthetic appearance, remove fluffy layers that can contribute to suspended fines, and prepare the surface for painting or sealants. The HEDPA process is applicable for these purposes.

Aside from dissolving the base metal oxide, other oxides might be present in the scale. Kinetic tests with the HEDPA-SFS system were performed to establish approximate dissolution rates for nonferrous metals of potential interest. Table 14 summarizes the dissolution tests completed up to the present.

TABLE 14

Rate Constants for the Dissolution of Metal Oxides in HEDPA Systems and Literature Values for Inorganic Acid Systems

| Oxide (M) | HEDPA (M) | SFS (M) | Metal (wt %) | T(° C.) | k(min$^{-1}$) | t$_{1/2}$(min) |
|---|---|---|---|---|---|---|
| Al$_2$O$_3$ | 0.5 | 0.1 | 1.0 | 90 | 2.19 × 10$^{-4}$ | 941 |
| ZnO | 0.5 | 0.1 | 1.0 | 90 | 1.91 × 10$^{-4}$ | 1079 |
| Cr$_2$O$_3$ | 0.5 | 0.1 | 1.0 | 90 | 1.12 × 10$^{-4}$ | 1839 |
| Nd$_2$O$_3$ | 0.5 | 0.1 | 1.0 | 90 | 1.79 × 10$^{-4}$ | 1151 |
| CeO$_2$ | 0.5 | 0.1 | 0.3 | 90 | 3.91 × 10$^{-4}$ | 527 |
| NiO | 0.5 | 0.1 | 0.05 | 90 | 1.91 × 10$^{-4}$ | 1079 |

Figure 8:
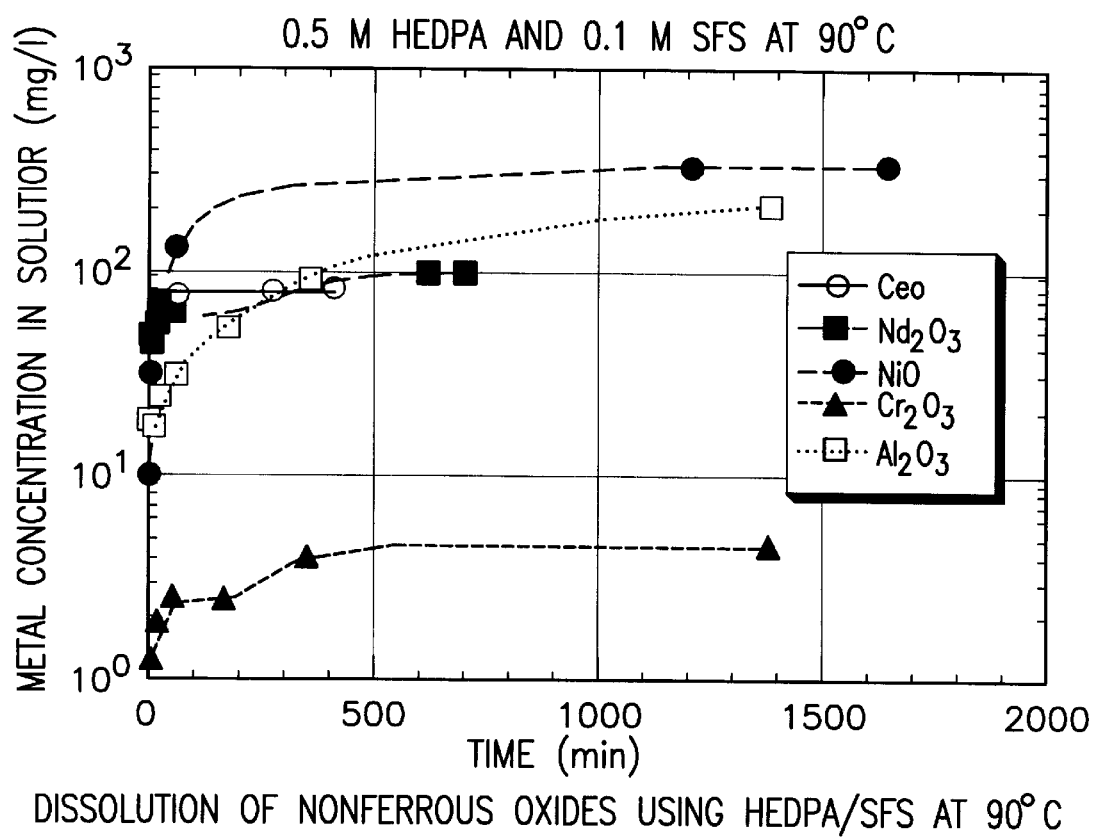
FIG. 8 is a graphical representation of data produced by the dissolution of non-ferrous oxides with HEDPA and SFS at 90° C.

FIG. 8 shows the dissolution of nonferrous metal oxides at 90° C. using 0.5 M HEDPA and 0.1 M SFS. The oxide with the lowest dissolution rate was Cr$_2$H$_3$. The rates are shown in Table 11 and are a few orders of magnitude lower than the ferrous oxides under similar reaction conditions and slightly lower surface area. Although these rates are lower than the ferrous metal values a practical D&D process can be designed around these values. Moreover, we have found that CuO will also dissolve in a solution of HEDPA and SFS.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A method of decontaminating a radioactively contaminated metal oxide on a surface comprising contacting said radioactively contaminated metal oxide with a diphosphonic acid solution for a time sufficient to dissolve the metal oxide forming a radioactive diphosphonic acid-metal complex and subsequently decomposing the radioactive diphosphonic acid-metal complex to produce a precipitate containing most of the radioactive values and a decomposed diphosphonic acid solution, and thereafter separating the decomposed diphosphonic acid solution from the precipitate.

2. The method of claim 1, wherein the diphosphonic acid is one or more of RCH$_2$PO$_3$H$_2$ and RCH (PO$_2$H$_2$)$_2$, where R is an alkyl, aryl, substituted alkyl or substituted aryl group.

3. The method of claim 2, wherein the disphosphonic acid includes 1-hydroxyethane-1,1-diphosphonic acid.

4. The method of claim 3, wherein the diphosphonic acid is present in solution at a concentration of from about 0.0001 M to about 4.3 M.

5. The method of claim 4, wherein the disphosphonic acid is present in solution at a concentration of about 0.5 M.

6. The method of claim 4, wherein the diphosphonic acid solution is maintained at a temperature in the range of from about 20° C. to about 200° C. during decontamination.

7. A method of decontaminating a radioactively contaminated surface including ferrous metal and non-ferrous metal values comprising contacting said radioactively contaminated surface with a mixture of a diphosphonic acid solution and a reducing agent or an oxidizing agent for a time sufficient to dissolve the metal oxide forming a radioactive diphosphonic acid-metal complex and subsequently decomposing the radioactive diphosphonic acid-metal complex to produce a precipitate containing most of the radioactive values and a decomposed diphosphonic acid solution, and thereafter separating the decomposed diphosphonic acid solution from the precipitate.

8. The method of claim 7, wherein the diphosphonic acid is one or more of RCH$_2$PO$_3$H$_2$ and RCH (PO$_2$H$_2$)$_2$, where R is an alkyl, aryl, substituted alkyl or substituted aryl group, wherein the diphosphonic acid is present in solution at a concentration of from about 0.0001 M to about 4.3 M, wherein the diphosphonic acid solution is maintained at a temperature in the range of from about 20° C. to about 200° C. during decontamination.

9. The method of claim 8, wherein the reducing agent or oxidizing agent includes at least one of SFS, $NaS_2O_4$, $Na_2SO_3$, ascorbic acid, hydroxylamine, zinc metal or other zero valent metal, metal salts or oxides, and $H_2O_2$.

10. The method of claim 9, wherein the reducing agent is SFS or hydroxylamine.

11. The method of claim 10, wherein the SFS or hydroxylamine is present at a concentrations in the range of from about 0.0001 M to about 2 M.

12. A method of decontaminating a radioactively contaminated surface including ferrous metal and non-ferrous metal oxide values comprising contacting said radioactively contaminated surface with a mixture of a HEDPA acid solution and a reducing agent or an oxidizing agent for a time sufficient to dissolve metal oxide values forming a radioactive HEDPA-metal complex and subsequently decomposing the radioactive HEDPA-metal complex to produce a precipitate containing most of the radioactive values and a decomposed HEDPA solution, separating the precipitate from the decomposed HEDPA solution.

13. The method of claim 12, wherein the precipitate is formed by adding SFS as a reducing agent to a concentration greater than about 0.1M.

14. The method of claim 12, wherein the precipitate is formed by the addition of an acidic or basic ion exchange resin.

15. The method of claim 12, wherein the precipitate is formed by the evaporation of the solution containing the radioactive values.

16. A method of decontaminating a radioactively contaminated surface including ferrous metal and non-ferrous metal oxide values comprising contacting said radioactively contaminated surface with a mixture of a diphosphonic acid solution and a reducing agent or an oxidizing agent for a time sufficient to dissolve the metal oxide and subsequently decomposing the radioactive diphosphonic acid-metal complex to produce a precipitate containing most of the radioactive values leaving a supernant solution containing low concentrations of radioactivity and/or metals, and removing the low concentrations of radioactivity and/or metals in a polishing step using selective magnetic particles.

17. The method of claim 16, wherein a precipitate is formed when the oxide values are one or more of $Fe_3O_4$, FeO and mixtures thereof and the ratio of iron oxide in weight percent to molarity of the diphosphonic acid is not less than 4.3:1 and not greater than about 19.6:1, and wherein the temperature of the solution of the oxide and diphosphonic acid is less than about 110° C.

18. The method of claim 16, wherein the diphosphonic acid is HEDPA and SFS is present at a concentration of about 0.1M, the metal oxide remains in solution if the ratio of metal oxide to HEDPA molarity is less than 2 at temperatures between 0° C. to about 100° C.; when the ratio of metal oxide to HEDPA molarity is greater than 2, then the metal oxide remains in solution only if the temperature of the solution is less than about 60° C. and at temperatures greater than about 60° C. a precipitate will form.

19. A method of removing oxide from a surface containing one or more of ferrous oxide and non-ferrous oxide values comprising contacting said oxide with a diphosphonic acid solution and a reducing agent for a time sufficient to dissolve the oxide and forming a radioactive diphosphonic acid-metal complex and subsequently decomposing the diphosphonic acid-metal complex to produce a precipitate containing most of the dissolved oxide values, and thereafter separating the decomposed diphosphonic acid solution from the precipitate.

20. The method of claim 19, wherein the diphosphonic acids are one or more or $RCHG18G_2PO_3H_2$ and $RCH(PO_2H_2)_2$, where R is an alkyl, aryl, substituted alkyl or substituted aryl group.

21. The method of claim 20, wherein the disphosphonic acid includes 1-hydroxyethane-1,1-diphosphonic acid, and the non-ferrous values are one or more of Al, Zn, Cr, Nd, Ce, Cu and Ni.

22. The method of claim 21, wherein the diphosphonic acid is present in solution at a concentration of from about 0.0001 M to about 4.3 M.

23. The method of claim 22, wherein the diphosphonic acid is present in solution at a concentration of about 0.5 M.

* * * * *

UNITED STATES PATENT AND TRADEMARK OFFICE
CERTIFICATE OF CORRECTION

PATENT NO.       : 6,504,077 B1
APPLICATION NO.  : 09/685495
DATED            : January 7, 2003
INVENTOR(S)      : Ankur Purohit et al.

It is certified that error appears in the above-identified patent and that said Letters Patent is hereby corrected as shown below:

Claim 20, line 30, delete "RCHG18G$_2$PO$_3$" and insert --RCH$_2$PO$_3$H$_2$.--
        line 31, delete "acids are" and insert --acid is--.;
        line 31, delete "or" and insert --of--;

Signed and Sealed this

Seventeenth Day of April, 2007

JON W. DUDAS
*Director of the United States Patent and Trademark Office*